(12) United States Patent
Mohammad et al.

(10) Patent No.: US 11,233,642 B2
(45) Date of Patent: Jan. 25, 2022

(54) REGULATING DOCUMENT ACCESS

(71) Applicant: Hewlett-Packard Development Company, L.P., Spring, TX (US)

(72) Inventors: Nassir Mohammad, Bristol (GB); Helen Balinsky, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 178 days.

(21) Appl. No.: 16/488,615

(22) PCT Filed: Apr. 27, 2017

(86) PCT No.: PCT/US2017/029916
§ 371 (c)(1),
(2) Date: Aug. 26, 2019

(87) PCT Pub. No.: WO2018/199963
PCT Pub. Date: Nov. 1, 2018

(65) Prior Publication Data
US 2020/0044843 A1    Feb. 6, 2020

(51) Int. Cl.
*H04L 9/08* (2006.01)
*G06F 21/62* (2013.01)
*H04L 29/06* (2006.01)

(52) U.S. Cl.
CPC ........ *H04L 9/0894* (2013.01); *G06F 21/6209* (2013.01); *H04L 9/085* (2013.01); *H04L 63/0435* (2013.01); *G06F 2221/2107* (2013.01)

(58) Field of Classification Search
CPC ... H04L 9/0894; H04L 9/085; H04L 63/0435; G06F 21/6209; G06F 2221/2107
See application file for complete search history.

(56) References Cited

U.S. PATENT DOCUMENTS 8,166,525 B2 *   4/2012   Gaucas ............... H04L 9/3268
                                                     726/5
8,560,846 B2 *   10/2013  Balinsky ............ G06F 21/6209
                                                     713/165

(Continued)

OTHER PUBLICATIONS

Welekar, R. et al., Client Server Based Robust Data Self Extraction Strategy, Mar. 18, 2016, < http://www.ierjournal.org/vol2iss1/64.Client%20Server%20Based%20Robust%20Data%20Self%20Extraction%20Strategy.pdf >.

(Continued)

*Primary Examiner* — J. Brant Murphy
(74) *Attorney, Agent, or Firm* — Nwamu PC

(57) ABSTRACT

A method for regulating document access, the method comprising providing a set of access keys for a user, respective ones of the keys providing different user access privileges for components of a composite document, selecting multiple nodes in a distributed storage system, distributing data representing N fragments of encrypted or unencrypted versions of the set of access keys and/or at least one of the individual keys and/or a symmetric key, K, associated with the user across N selected nodes of the distributed storage system, wherein the encrypted versions are encrypted using the symmetric encryption key, K, associated with the user, encrypting data relating to address information of the N selected nodes using a public encryption key of the user to generate a location object and storing the location object as a component of the composite document.

15 Claims, 3 Drawing Sheets

(56) References Cited

U.S. PATENT DOCUMENTS

| | | | | |
|---|---|---|---|---|
| 8,732,481 B2* | 5/2014 | Balinsky | ............... | H04L 9/0866 713/189 |
| 8,856,532 B2* | 10/2014 | Boyer | ................... | H04L 9/3247 713/175 |
| 8,857,727 B2* | 10/2014 | Simske | ............ | G06K 19/06037 235/494 |
| 8,984,298 B2* | 3/2015 | Balinsky | ............. | G06F 21/6209 713/189 |
| 2010/0058072 A1* | 3/2010 | Teow | .................. | G06F 21/6218 713/193 |
| 2012/0185701 A1* | 7/2012 | Balinsky | ............. | G06F 21/6209 713/193 |
| 2012/0303968 A1* | 11/2012 | Balinsky | ............... | H04L 9/3247 713/189 |
| 2013/0191632 A1* | 7/2013 | Spector | ................. | H04L 9/0847 713/155 |
| 2013/0193217 A1* | 8/2013 | Simske | ............ | G06K 19/06037 235/494 |
| 2013/0198524 A1* | 8/2013 | Balinsky | ............... | H04L 9/0866 713/189 |
| 2015/0310188 A1* | 10/2015 | Ford | ................... | H04L 63/0428 726/28 |
| 2016/0110320 A1* | 4/2016 | Balinsky | ................ | H04N 1/387 358/1.15 |
| 2018/0302217 A1* | 10/2018 | Hevia Angulo | .... | H04L 63/0442 |

OTHER PUBLICATIONS

Xiong, J. et al., A Secure Data Self-destructing Scheme in Cloud Computing, 2014, < http://pdgindia.com/uploads/a_secure_data_self-destructing_scheme_in_cloud_computing276201635735.pdf>.

Xiong, J-B. et al., A Secure Self-destruction Scheme for Composite Documents with Attribute Based Encryption, Nov. 8, 2013, < http://www.ejournal.org.cn/EN/abstract/abstract8108.shtml# >.

* cited by examiner

REGULATING DOCUMENT ACCESS

BACKGROUND

A composite document, which can include document content components and component access meta-data, can be used in a workflow to provide multiple users with different access privileges for the various document components.

Such documents may lend themselves to being shared between multiple users and as such multiple copies of a composite document may exist across multiple user devices and storage providers and may remain accessible after workflow fulfilment.

BRIEF DESCRIPTION OF THE DRAWINGS

Various features of certain examples will be apparent from the detailed description which follows, taken in conjunction with the accompanying drawings, which together illustrate, by way of example only, a number of features, and wherein.

DETAILED DESCRIPTION

Figure 1:
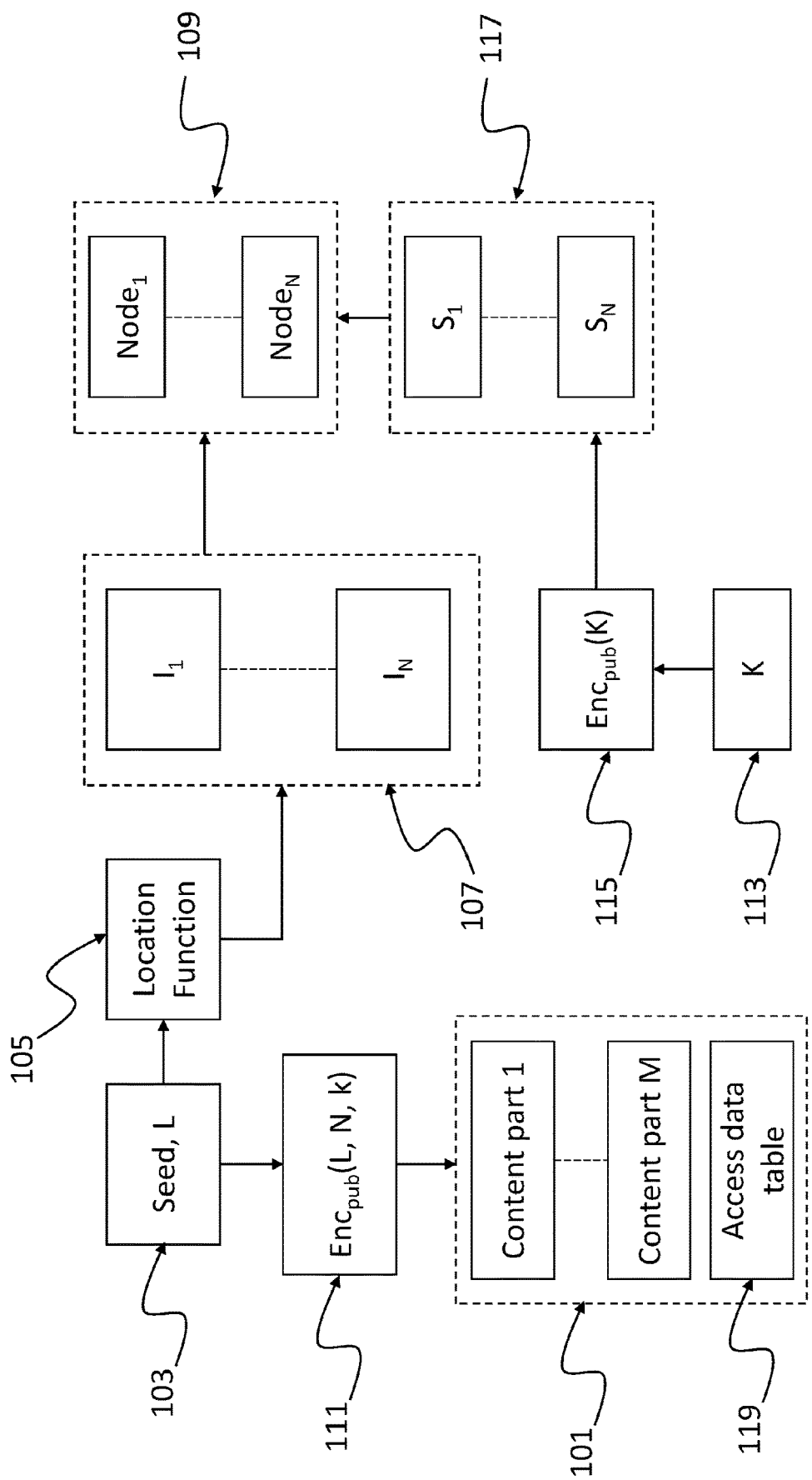
FIG. 1 is a schematic representation of a system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

According to an example, a composite document can be securely shared between multiple users. Access to the document and/or components thereof can be simultaneously and selectively destroyed or cancelled. A document owner or content controller can therefore regulate access to documents or components without having to perform any further explicit actions. In an example, a previously trusted user that possesses one or more copies of a composite document will therefore be incapable of retroactively decrypting document content-parts in any copies of the document wherever they may reside. Indeed, even the document creator may be unable to decrypt the document.

According to an example, a user's access to a composite document can be revoked, in order to enforce workflow deadlines for example, whilst access to the same differentially accessible document can be maintained for other users. Revocation refers to certain user's accessibilty to the whole document or to certain content-parts, or destruction of access to some or all content-parts for all users, including the document owner. Thus, any previously trusted user that possesses copies of a document will not be able to retroactively decrypt document parts simultaneously over all existent copies. This precept may also be generalised to any system where differential access control is required, and selective self/enforced-destruction of access or data can be used.

According to an example, a composite document can be a document that integrates sensitive document content with corresponding access control meta-data and can be in the form a non-separable, fine grained, encrypted and tamper-proof digital bundle. The content-parts can retain their original format and each workflow participant can be assigned particular access rights for the content parts by a document creator or controller.

Each content-part can be encrypted, signed and serialized into a content-parts table, which can comprise a list of content or parts that form the composite document, and access rights to each of those parts for multiple users. In an example, a composite document can include the content-parts table comprising details of the document itself. A user may digitally sign their part of the content-parts table within the document using an encrypted signature.

A user given no access to a content-part, but who is still a document workflow participant can have access to a signature verification key V to ensure authenticity. A user given read only access can be further provided with a symmetric key D to enable the user to decrypt encrypted content, while a user with read/write access, enabling reading, modifying, adding or replacing content-parts can be given the full set of keys {E/D,V,Q}, where Q is a signature key used to sign a modified content-part to be verified by any subsequent workflow participant.

The subset of content-part keys can be stored in a row of a participants individual key-map table that may be encrypted by a user's symmetric key K, which itself may then encrypted by the user's public key and stored in a 'user's row' of the entry-table. Thus, according to an example, a user with the corresponding private key can decrypt and unravel their version of the document. In an example, each participant can have a key-map file which contains access keys for the content-parts of a document. The key-map files may be encrypted and stored in an entry table of the document, which can be a separate table to the content-parts table, also within the document. In an example, an entry table can contain all of the key-map files for the authorised users of the composite document. In an example, the entry-table can be signed by a document creator so that no unauthorised changes can be made to any of the fields.

According to an example, since recovery of a user's keymap key, K, determines access by the user to the content-part keys {E/D,V,Q}, a particular user's access to the entire document (and indeed any copies of the document that may exist) can be made to 'self-destruct' at a pre-defined time by disabling or removing the ability for the user to be able to use, determine or recover K.

Access to documents and components thereof can therefore be regulated by a document creator by providing a set of access keys for a user, respective ones of the keys providing different user access privileges for components of a composite document. Respective ones of the keys or the set of access keys as a whole can be encrypted using a symmetric encryption key, K, associated with the user to generate a set of individually encrypted keys or an encrypted key set.

According to an example, multiple nodes in a distributed storage system can be selected, and data representing N fragments from the encrypted (or an unencrypted version of the) key set and/or at least one of the individually encrypted (or unencrypted versions of the) keys and/or the symmetric key K associated with the user can be distributed across N selected nodes of the distributed storage system. Data relating to address information of the N selected nodes can be encrypted using a public encryption key of the user to generate a location object and the location object can be stored or otherwise provided as a component of the composite document. In an example, fragments of a single key or a set of keys can be can be distributed in an unencrypted form, or by way of a combination of distributing fragments in an encrypted and unencrypted form can be used.

In an example, K can be encrypted using a user's public key to obtain $Enc_{pub}(K)$. A threshold secret sharing scheme can be used to split $Enc_{pub}(K)$ into N pieces, $S_1, \ldots, S_N$. The data can be split using a scheme in which the encrypted key is divided in such a way that knowledge of any k or more pieces makes $Enc_{pub}(K)$ determinable. Knowledge of any k−1 or fewer pieces leaves $Enc_{pub}(K)$ indeterminable. In an example, Shamir's secret sharing scheme can be used.

The threshold parameter, k, can be preselected and is used to determine how many of the N shares ($S_1, \ldots, S_N$) are used to reconstruct $Enc_{pub}(K)$. For example, if $Enc_{pub}(K)$ is split into N=20 shares and the threshold is 10, $Enc_{pub}(K)$ can be computed given any 10 of 20 shares.

According to an example, an access key, L, can be used as input (seed) to a cryptographically secure pseudo random number generator used to derive N indices. In an example, the indices can be used to select nodes in a distributed storage system, such as a distributed hash table (DHT) for example. That is, each index that is generated can relate to the address of a node in a DHT, for example. Accordingly, the access key, L, can be used as input to a location function that can generate a list of indices, $I_1, \ldots, I_N$, relating to or otherwise associated with the location or address of respective nodes in a distributed storage system.

Reconstruction data, which enables $Enc_{pub}(K)$ to be recovered can be encapsulated into a Data Object, SDDO. In an example, the reconstruction data is the tuple (L, N, k). In an example, the N shares of $Enc_{pub}(K)$, $S_1, \ldots, S_N$, are distributed across nodes of the distributed storage network at the locations constructed using L.

The data object can be encrypted using a public encryption key of the user to generate $Enc_{pub}(L, N, k)$, which can then be stored in a 'user's row' of the entry-table of the composite document and can be decrypted by a user with the corresponding private key.

Once more than (N−k) shares are lost due to churn in the DHT (or the distributed system), the item $Enc_{pub}(K)$, and hence K, becomes irretrievable from the DHT. In an example, a document owner can keep copies of all keys generated for the document to maintain their own permanent access regardless of data availability in the global scale distributed system.

According to an example, knowledge of the rate at which data in a distributed system is overwritten can be used to determine how many shares should be distributed and how many (k) of those shares are to be used to reconstruct $Enc_{pub}(K)$. If the data churn in a system is high, and access to a document component is required for a relatively long time for example, then a higher number of nodes can be selected to receive shares and/or k can be low so that there will be a sufficient number of shares remaining after a given time to enable a user to reconstruct $Enc_{pub}(K)$. Conversely for example, in a system in which data is overwritten less frequently, fewer nodes can be selected and/or the value of k can be relatively higher as there is likely to be a sufficient number of shares available within a given time period to enable reconstruction.

Access to a composite document can be line grained by having a document creator encrypt each user's available content-part decryption key, $D_i$, with their unique user keymap key, K, to yield $Enc_K(D_i)$, which can then be encapsulated into a SDDO, i.e. (L, N, k). In an example, $Enc_K(D_i)$ can be split into fragments, respective ones of which can be distributed across nodes in a distributed storage system, such as a DHT, at the locations constructed using L. The encapsulation (L, N, k) can be encrypted using K to give $Enc_K(L, N, k)$, which can be stored in each user's (that has been given read access) keymap table in the row corresponding to the content-part.

Note that once the expiry is reached, (L, N, k) will not yield $Enc_K(D_i)$, and hence decryption by K will not yield the content-part symmetric key $D_i$ in any document copies for the specific user. If the same expiry time is used for each user, then the content-part becomes inaccessible for all users. The ability of a content-part to be authentically modified (read/write access) can also be regulated using a similar approach for the signature key, Q. Even the verification key V can be regulated so a user is given no verification access of the content-part either.

For certain document workflows, the lifetime offered for a particular content-paert or indeed the access to the document by a user may be too limiting, e.g. when a document is sent for completion but a user requests a deadline extension or is away on holiday. For example, in some DHTs, expiry time for data reconstruction can be as low as 8 hours, meaning that a share of an encrypted key may quickly be deleted from a node/location.

However, a DHT may also have a republishing mechanism for index-value pairs where the same published data shares in the DHT are re-pushed to the same locations periodically until a desired timeout. In an example, DHT mechanisms can be utilized by a document owner to extend the life of a particular SDDO for a composite document. Furthermore, if changes are to be made to the actual document then a new authentically signed version can also be sent. A document owner may also wish to revoke access to a particular document after having sent it to a user but before automatic document expiry, e.g. the wrong user had been selected. In an example, this can be dealt with by the owner pushing 'garbage' data to a number of locations in a DHT greater than the threshold value.

As noted above, expiration times of the user's keymap key, K, and content-part keys determine the lifetime and fine grained accessibility in relation to a composite document. However, in some situation certain users, e.g. administrators, owners and record management may be given full and permanent access by being given the actual content-part keys, while general employees or outside contractors and collaborators may be provided with 'self-destructing' encrypted keys, as described above for example.

According to an example, keys can be split and fragments (shares) stored not just in a decentralized worldwide distributed system, but also on a single entity's servers. This can increase the surface of attacks for any adversaries since compromise of either only the single entity, or only of the distributed storage system does not yield enough data to reconstruct the stored encrypted keys.

In a deployed example, using a DHT network, each node was assigned a random 160-bit ID based on its IP and port, which determines the index ranges that it will store. To store an [index, value] pair in the DHT, where index locations are generated by L (when creating a SDDO), and the values are the encrypted data shares to be distributed, 20 nodes with IDs closest to the specified index can be determined and a DHT store message command can be transmitted to the nodes. The DHT nodes republish the entries in their cache database every 30 minutes to the other 19 nodes closest to the value's index in order to combat churn in the DHT. For reconstruction from a SDDO, the encrypted key is recovered using L to recover index positions and by querying any DHT node to find the data associated with the indexes using the DHT 'get' command. The message is routed through the DHT to the node responsible for a particular index which replies with the stored data. Once enough shares are recovered (at or greater than the threshold) the data can be reconstructed.

FIG. 1 is a schematic representation of a system according to an example. A composite document 101 comprises M content parts and an access data table 119 that includes meta data relating to access control for the document components. A seed, L 103, is input to a location function in block 105 to generate N indices 107 ($I_1, \ldots, I_N$) representing N selected nodes in a distributed storage network 109, which may be a DHT as noted above. The N nodes may be a subset of the available nodes in the network 109

The seed. 103, is part of a tuple that also comprises N and the threshold, k, as described above and forms data relating to address information of the N nodes. The tuple can be encrypted using a public encryption key of the user to generate $Enc_{pub}(L, N, k)$ as shown in block 111 to generate a location object, and in an example the location object. $Enc_{pub}(L, N, k)$, is stored as a component of the composite document 101.

According to an example, a key, K, can be used by a user of the document 101 to decrypt one or more access keys that are used to regulate access privileges to one or more of the content parts of the document 101. Thus, in an example, without knowledge of the key 113. K, a user will be unable to read, write or make any changes to a content part of the document because they will be unable to decipher a key associated with the content part and the action they wish to perform.

In an example, key 113 can be encrypted using a public encryption of the user to generate $Enc_{pub}(K)$ in block 115. As described above, $Enc_{pub}(K)$ can be split into N fragments or shares, $S_1, \ldots, S_N$, 117. Respective ones of the fragments are distributed across the N nodes of the network 109 so that, in an example, each node stores one fragment.

Thus, a user wishing to access one or more content parts of document 101 can use their private encryption key to decrypt $Enc_{pub}(L, N, k)$. This provides the information needed to reconstruct $Enc_{pub}(K)$ from which the user can get K, thereby providing them with the key to decrypt the keymap for the document 101.

As noted above, with reference to FIG. 1, fragments of $Enc_{pub}(K)$ are distributed over nodes 109. However, according to an example, fragments from the encrypted or unencrypted key set and/or at least one of the individually encrypted or unencrypted keys and/or the symmetric key associated with the user can be distributed across N selected nodes of the distributed storage system 109.

Figure 2:
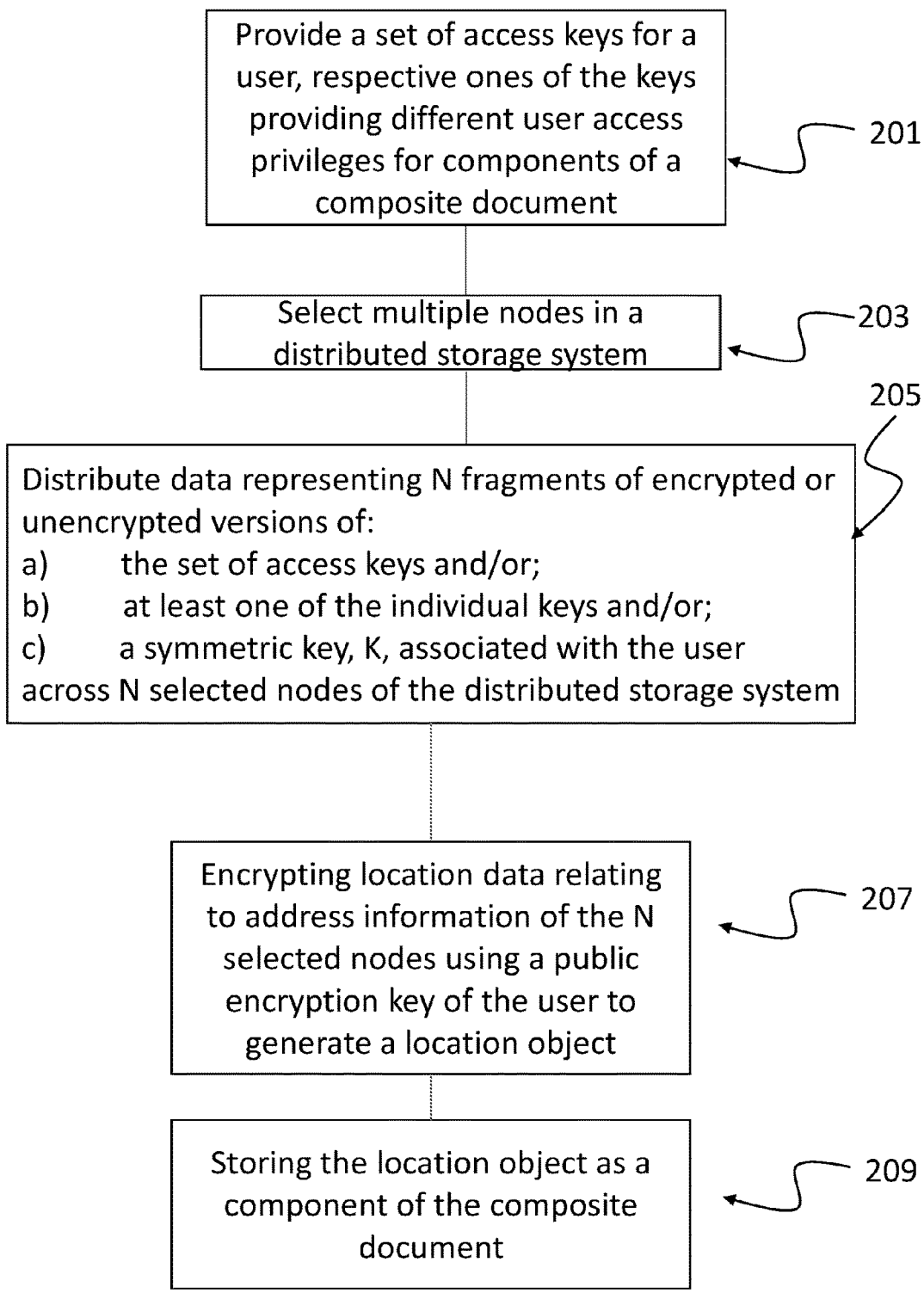
FIG. 2 is a flowchart showing a method for regulating document access according to an example.

FIG. 2 is a flowchart showing a method for regulating document access according to an example. In block 201 a set of access keys for a user is provided, respective ones of the keys providing different user access privileges for components of a composite document. In block 203 multiple nodes in a distributed storage system are selected.

In block 205 data representing N fragments of encrypted or unencrypted versions of the set of access keys and/or at least one of the individual keys and/or a symmetric key, K, associated with the user is distributed across N selected nodes of the distributed storage system. In an example, the encrypted versions can be encrypted using the symmetric encryption key, K, associated with the user. In block 207 data relating to address information of the N selected nodes is encrypted using a public encryption key of the user to generate a location object and in block 209 the location object is stored as a component of the composite document.

According to an example, a composite document as described herein can comprise components suitable for use in the manufacture of a three-dimensional object. For example, respective components can be provided for one or more of: the design geometry of the object; information representing one or more powders used to build/print the object; information representing a binding agent; information representing a detailing agent; information representing a surface color, pattern, finishing; information representing an article identifier; information representing a manufacturing licence (e.g. access key and number of copies) or information representing a design certification (e.g. safety) and so on.

Examples in the present disclosure can be provided as methods, systems or machine readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above may show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of a system that can perform certain operations (for example, blocks 111, 105, 115, 117 and so on of FIG. 1) may be implemented by a processor executing machine readable instructions stored in a memory, or a processor operating in accordance with instructions embedded in logic circuitry. The term 'processor' is to be interpreted broadly to include a CPU, processing unit. ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 3:
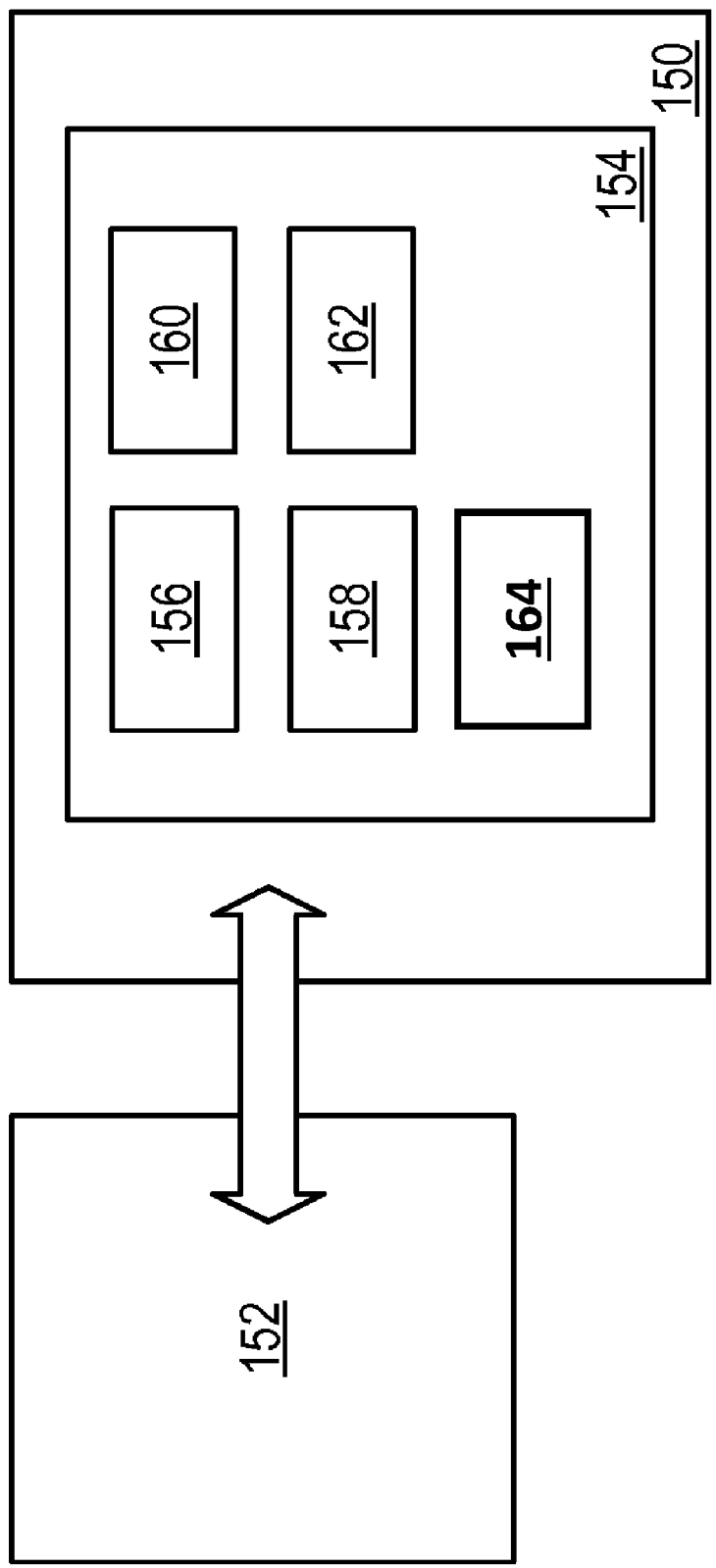
FIG. 3 is a schematic representation of a processor associated with a memory according to an example.

FIG. 3 shows an example of a processor 150 associated with a memory 152. The memory 152 comprises computer readable instructions 154 which are executable by the processor 150. The instructions 154 comprise:

Instructions 156 to provide a set of access keys for a user, respective ones of the keys providing different user access privileges for components of a composite document;

Instruction 158 to select multiple nodes in a distributed storage system;

Instructions 160 to distributing data representing N fragments of encrypted or unencrypted versions of the set of access keys and/or at least one of the individual keys and/or a symmetric key, K, associated with the user across N selected nodes of the distributed storage system; and Instructions 162 to encrypt data relating to address information of the N selected nodes using a public encryption key of the user to generate a location object and store the location object is stored as a component of the composite document.

Instructions 164 are provided to encrypt the set of access keys and/or at least one of the individual keys and/or a symmetric key, K, associated with the user using the symmetric encryption key, K, associated with the user.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for regulating document access, the method comprising:
   providing a set of access keys for a user, respective ones of the keys providing different user access privileges for components of a composite document;
   selecting multiple nodes in a distributed storage system;
   distributing data representing a first variable "N" fragments of encrypted or unencrypted versions of at least one of:
   a) the set of access keys;
   b) at least one of the individual keys or;
   c) a symmetric encryption key, K, associated with the user across a second variable "N" selected nodes of the distributed storage system,
   wherein the encrypted versions are encrypted using the symmetric encryption key, K, associated with the user;
   encrypting data relating to address information of the second variable "N" selected nodes using a public encryption key of the user to generate a location object; and
   storing the location object as a component of the composite document.

2. A method as claimed in claim 1, further comprising using a location determining function to select the multiple nodes.

3. A method as claimed in claim 2, further comprising:
   encrypting a data object using a public encryption key of the user.

4. A method as claimed in claim 1, wherein the data comprises a location access key or the address information of respective ones of the second variable "N" selected nodes.

5. A method as claimed in claim 1, further comprising:
   generating a data object comprising a tuple including a location key, a threshold value and the second variable "N",
   wherein selecting multiple nodes in a distributed storage system further comprises:
   using the location key as a seed for a location function.

6. A method as claimed in claim 5, further comprising:
   generating a third variable "N" location indices, each of which representing the location of one of the second variable "N" selected nodes.

7. A method as claimed in claim 5, further comprising setting the threshold value to a value representing a minimum number of fragments of the encrypted key to reconstruct the encrypted key set.

8. A system for regulating document access in which a set of access keys is provided for a user, respective ones of the keys providing different user access privileges for components of a composite document, the system comprising:
   multiple nodes in a distributed storage system selected to receive data representing a first variable "N" fragments of encrypted or unencrypted versions at least one of:
   a) the set of access keys;
   b) at least one of the individual keys or;
   c) a symmetric encryption key K, associated with the user,
   wherein the encrypted versions are encrypted using the symmetric encryption key, K, associated with the user;
   the system to encrypt data relating to address information of the selected nodes using a public encryption key of the user to generate a location object; and
   store the location object as a component of the composite document.

9. A non-transitory machine-readable storage medium encoded with instructions for regulating access to one or more components of a composite document using a set of access keys for a user, respective ones of the keys providing different user access privileges for components of a composite document, the instructions executable by a processor of a system to cause the system to:
   select multiple nodes in a distributed storage system;
   distribute data representing a first variable "N" fragments of encrypted or unencrypted versions of at least one of:
   a) the set of access keys;
   b) at least one of the individual keys or;
   c) a symmetric encryption key, K, associated with the user,
   wherein the encrypted versions are encrypted using the symmetric encryption key, K, associated with the user, across a second variable "N" selected nodes of the distributed storage system;
   encrypt data relating to address information of the second variable "N" selected nodes using a public encryption key of the user to generate a location object; and
   store the location object as a component of the composite document.

10. A non-transitory machine-readable storage medium encoded with instructions as claimed in claim 9, the instructions executable by a processor of a system to further cause the system to use a location determining function to select the multiple nodes.

11. A non-transitory machine-readable storage medium encoded with instructions as claimed in claim 9, the instructions executable by a processor of a system to further cause the system to:
generate a data object comprising a tuple including a location key, a threshold value and the second variable "N"; and
use the location key as a seed for a location function.

12. A non-transitory machine-readable storage medium encoded with instructions as claimed in claim 11, the instructions executable by a processor of a system to further cause the system to set the threshold value to a value representing a minimum number of fragments of the encrypted key to reconstruct the encrypted key set.

13. A non-transitory machine-readable storage medium encoded with instructions as claimed in claim 9, the instructions executable by a processor of a system to further cause the system to generate a third variable "N" location indices, each of which represent the location of one of the selected nodes.

14. A non-transitory machine-readable storage medium encoded with instructions as claimed in claim 9, the instructions executable by a processor of a system to further cause the system to encrypt a data object using a public encryption key of the user.

15. A non-transitory machine-readable storage medium encoded with instruction as claimed in claim 9, the instructions executable by a processor of a system to further cause the system to distribute dummy data to one or more nodes of the distributed storage system.

* * * * *